Oct. 27, 1964 R. T. MERCER ETAL 3,153,962
METHOD AND APPARATUS FOR TRIMMING EDGES OF SHEETS
Filed June 18, 1962 5 Sheets-Sheet 1
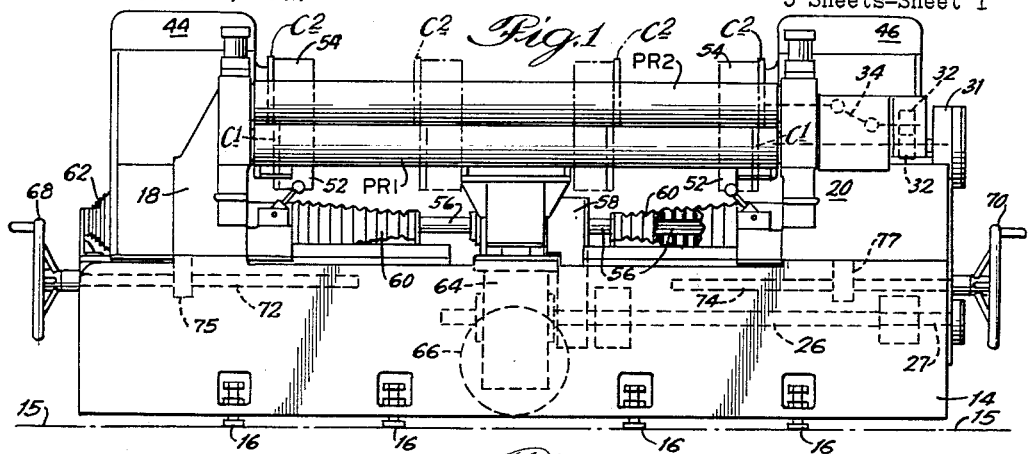
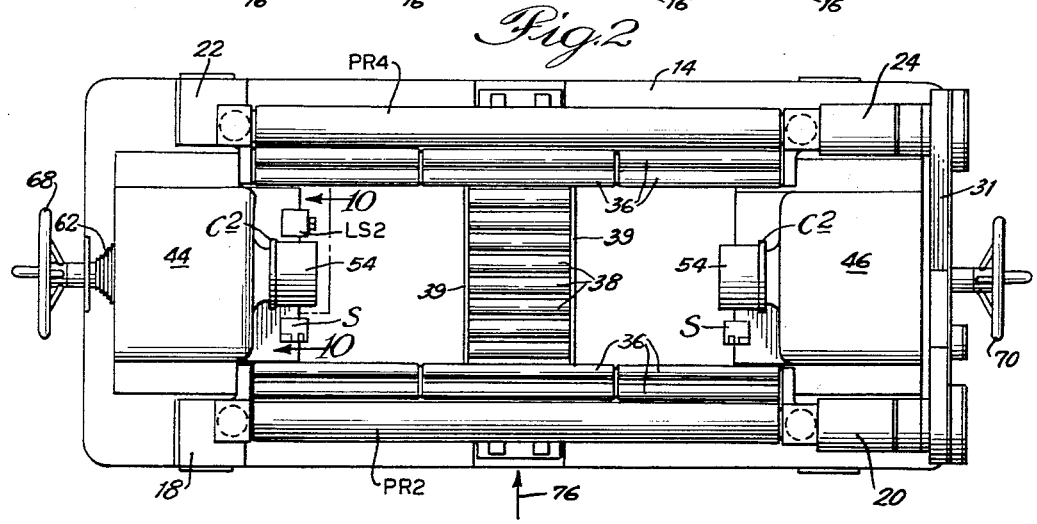
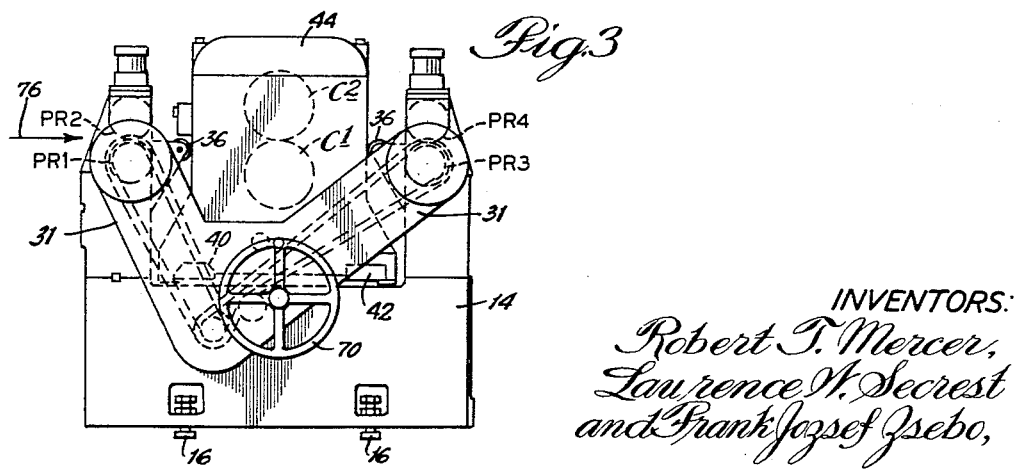
INVENTORS:
Robert T. Mercer,
Lawrence W. Secrest
and Frank Jozsef Zsebo,
BY Bair, Freeman & Molinare
ATTORNEYS.

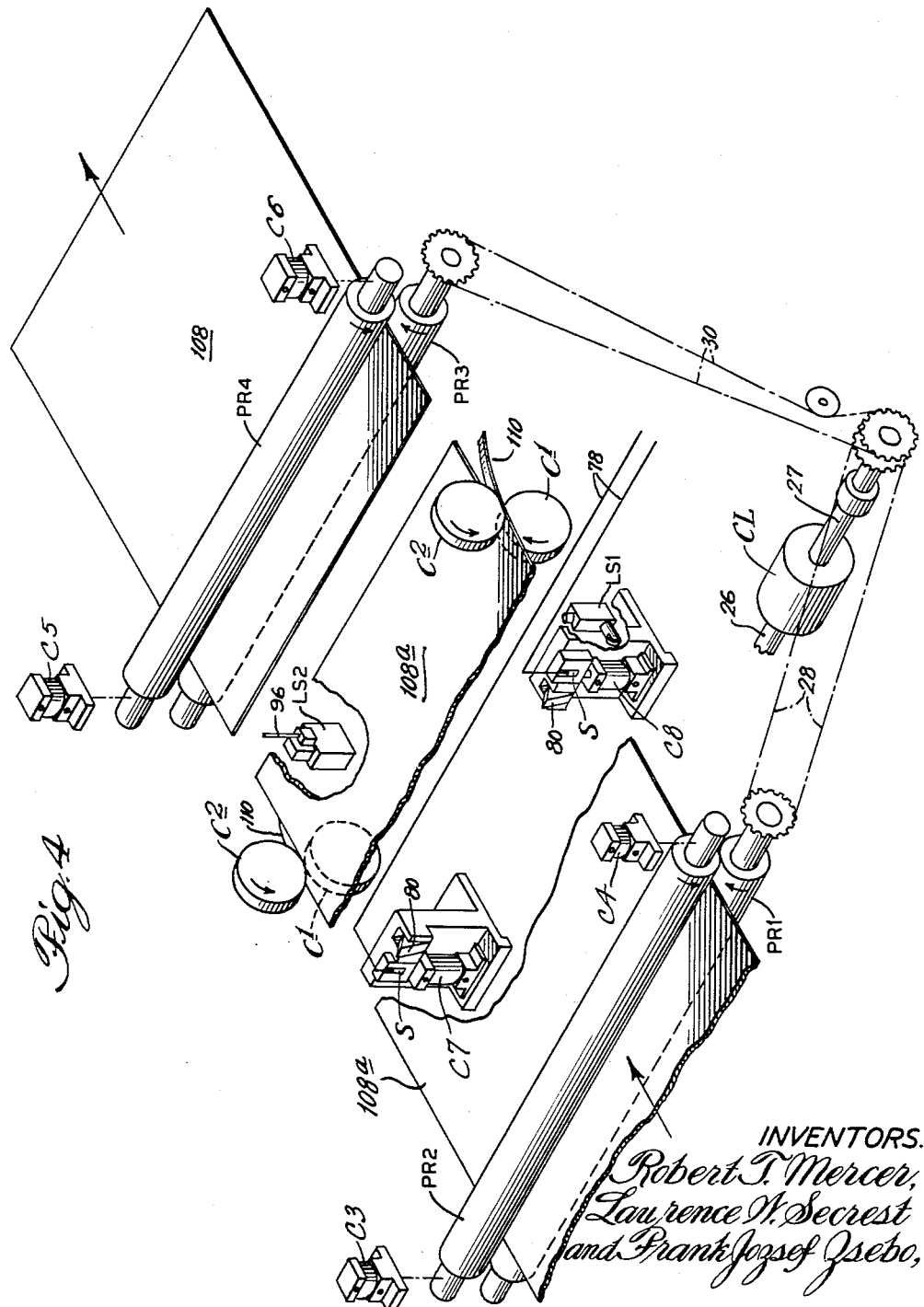

Oct. 27, 1964     R. T. MERCER ETAL     3,153,962
METHOD AND APPARATUS FOR TRIMMING EDGES OF SHEETS
Filed June 18, 1962                        5 Sheets-Sheet 3
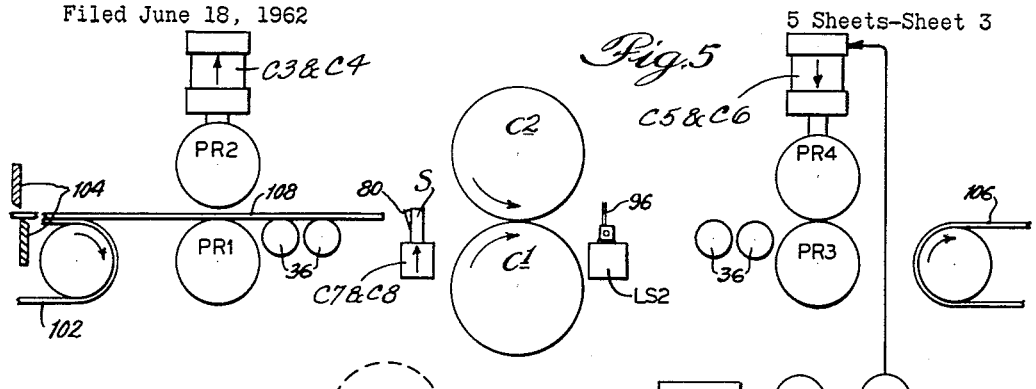
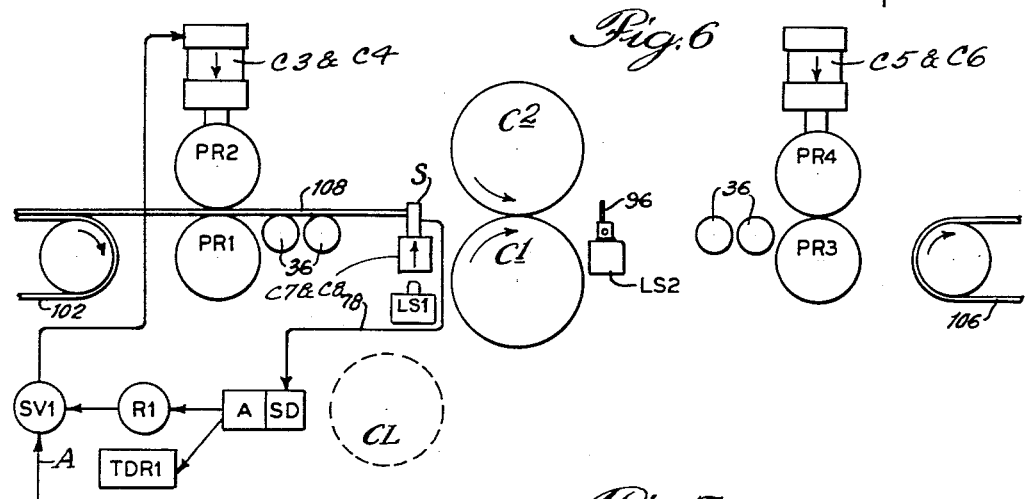
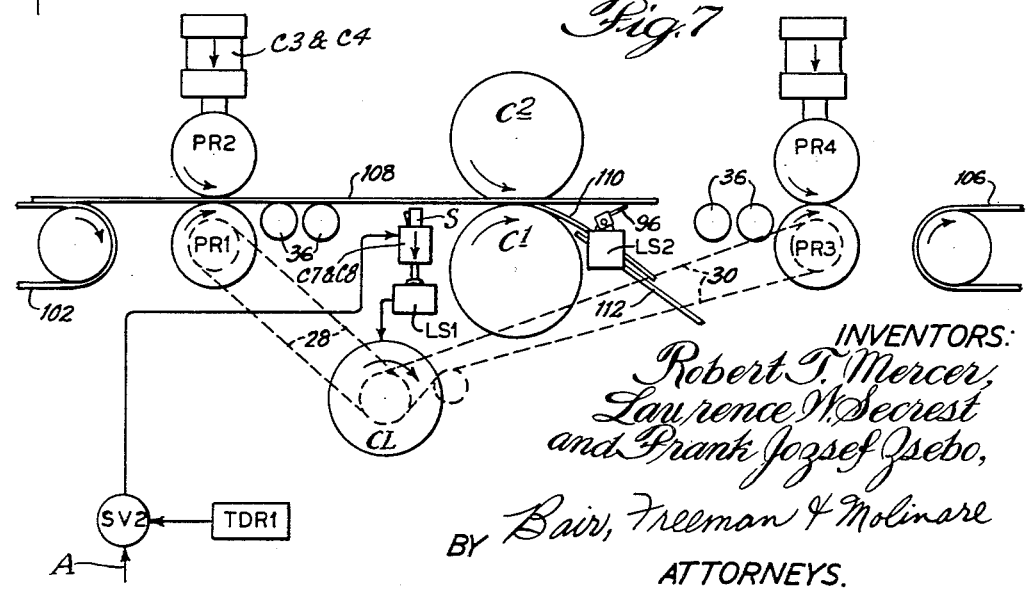
INVENTORS:
Robert T. Mercer,
Lawrence W. Secrest
and Frank Jozsef Jsebo,
BY Bair, Freeman & Molinare
ATTORNEYS.

INVENTORS:
Robert T. Mercer,
Lawrence W. Secrest
and Frank Jozsef Zsebo,

BY Bair, Freeman & Molinare

ATTORNEYS.

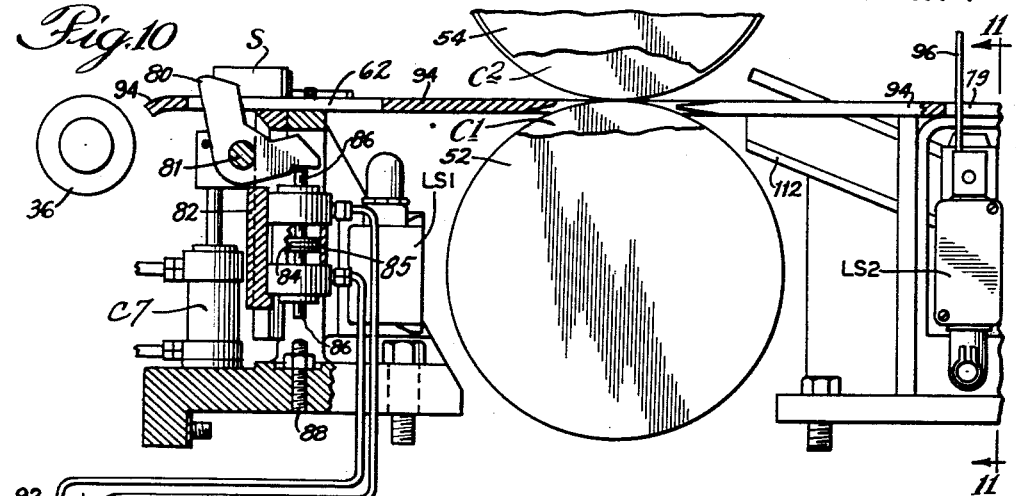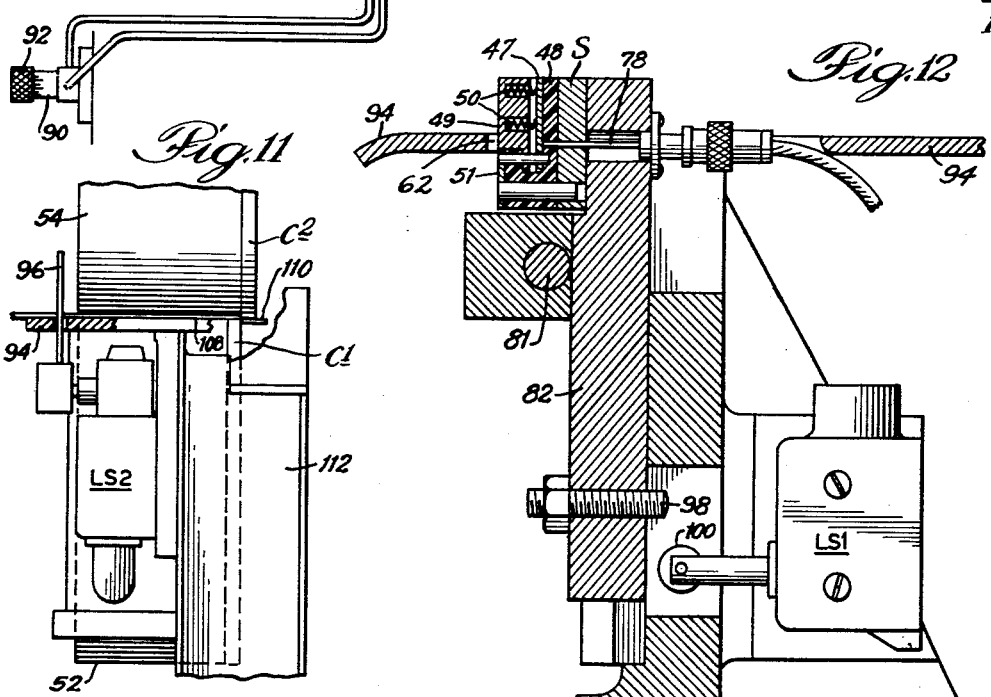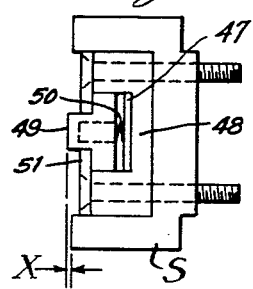

United States Patent Office 3,153,962
Patented Oct. 27, 1964

3,153,962
METHOD AND APPARATUS FOR TRIMMING EDGES OF SHEETS
Robert T. Mercer, Lima, Ohio, Laurence W. Secrest, Alexandria, Va., and Frank Jozsef Zsebo, Takoma Park, Md., assignors to Lennox Industries, Inc., Marshalltown, Iowa, a corporation of Iowa
Filed June 18, 1962, Ser. No. 203,178
11 Claims. (Cl. 83—79)

This invention relates in general to apparatus for trimming the side edges of sheets of metal or the like so that they are parallel to each other and bear a desired angular relation to an end edge of the sheet, the method involved being claimed in our copending application, Serial No. 322,706, filed November 12, 1963.

Sheet metal as rolled at the mill does not have truly parallel straight side edges but rather somewhat wavy side edges which are in general parallel but not straight. An attempt to trim the edges parallel and straight by passing them through spaced-apart shearing rollers and then cutting lengths from the ribbon of sheet metal is not successful in producing truly straight and parallel sides with end cuts at a desired angle (usually 90°) to the side edges of the sheet.

Accordingly, one object of our invention is to provide an apparatus wherein first of all rough lengths are cut from the ribbon of sheet metal, and then the two side edges are trimmed accurately at the desired angle with relation to a front edge of the sheet and parallel to each other whereby a sheet having three straight edges results with the side edges parallel. The sheet may then be trimmed to length at the rear edge and at the desired angle relative to the parallel side edges.

Another object is to provide apparatus for trimming edges of a sheet, cutting a length of sheet from a ribbon of sheet, moving the length of sheet longitudinally to engage its leading edge with a pair of spaced stops to orient said leading edge, gripping the oriented sheet, moving it as oriented longitudinally, and trimming the side edges of the sheet at a predetermined angle relative to the oriented leading edge thereof.

Still another object is to provide apparatus comprising a pair of stops against which the leading edge of a sheet may be positioned, in order to orient the leading edge thereof, propelling rollers which then grip the oriented sheet and upon rotation maintain its orientation while at the same time forcing it through trimming shear rollers thus trimming the sides thereof parallel and at the desired angle relative to the two stops whereby the finished sheet as it issues from the apparatus has its side edges parallel and at the desired angle to the leading edge thereof. The sheet may thereupon be delivered to a line of metal forming operations which cut the trailing edge as desired and perform the required forming operations. In this connection the major requirement is for rectangular sheets, and our apparatus delivers a sheet with three edges properly trimmed and squared to each other as well as the side edges parallel to each other, thus, facilitating the final cut of the sheet (its trailing edge at a point to give the desired length and square to the side edges).

As coiled steel strip is rolled at the mill there is what is commonly called "camber" rolled into almost any strip. Camber is defined as the lateral curvature or deviation from an imaginary straight line if the coil were unrolled and laid out flat. This deviation can be as much as one inch in twenty feet of strip length.

In the conventional edge trimming system as done in a continuous strip line it is impossible to remove all the camber from a strip as the cutters tend to follow the existing camber, even when a tracking or edge sensing device to control the path of the edge of the strip is used. The strip therefore cannot be cut into finished square sheets.

Accordingly, it is our purpose to provide apparatus that produces a sheet with both sides straight, parallel and square or at some desired angle other than 90° with the leading edge. This is accomplished by edge trimming both sides of the sheet after it has been cut from the coil. By doing this we eliminate the camber from the coil. Since the sheet is now no longer a part of the coil we can trim the edges square with the leading edge because we register the leading edge against stops, clamp it and then drive it between the cutters while maintaining this oriented position. The only succeeding operation necessary to obtain a perfectly square sheet to desired dimensions is to reshear the trailing edge to the required length and square with the side edges.

This last shearing operation is only necessary where camber in the coil is severe enough to cause the leading edge of the sheet to be out of parallel with the trailing edge. In other words, if the strip moves from side to side as it traverses through the decoiling and shearing line the shear cuts will not be parallel and will require reshearing of the trailing edge. Since this is the rule rather than the exception however we initially cut the sheets slightly longer than necessary and the last shearing operation is then performed to cut them to the exact lengths desired.

Still a further object is to provide an automatically cycling apparatus comprising entrance and exit pinch rolls which may be pneumatically engaged and disengaged with respect to a sheet passing through our machine, a pair of laterally spaced stops for the sheet including sensing electrodes and shock absorbing means, rotary edge trimming cutter knives for the edges of the sheet and means to rotate the pinch rolls and the cutters.

An additional object is to provide automatic operation for the pinch rolls and stops wherein the entrance pinch rolls are open until the leading edge of the sheet engages the stops whereupon the stops are retracted, the entrance rolls closed and a clutch energized for rotating them for feeding the sheet through the machine and past the edge trimming cutter knives whereupon they are picked up by the exit pinch rolls and moved on to a take-away conveyor, the operating cycle for that sheet being then terminated by opening the entrance pinch rolls.

With these and other objects in view, our invention consists in the construction, arrangement and combination of the various parts of our apparatus for trimming edges of sheets, whereby the objects above contemplated are attained, as hereinafter more fully set forth, pointed out in our claims and illustrated in detail on the accompanying drawings, wherein:

FIG. 1 is a front elevation of an apparatus embodying our invention for trimming edges of sheets.

FIG. 2 is a plan view thereof.

FIG. 3 is an end elevation looking at the right hand end of FIG. 1.

FIG. 4 is a diagrammatic perspective view thereof.

FIGS. 5, 6, 7, 8 and 9 are diagrammatic views showing the position of various parts and various automatic operations that occur during a cycle of operation of our apparatus.

FIG. 10 is an enlarged vertical sectional view on the line 10—10 of FIG. 2 showing a sheet stop and cutter knives, limit switches in relation thereto.

FIG. 11 is an elevation of one of the limit switches shown in FIG. 10 as on the indicated line 11—11 thereof.

FIG. 12 is a sectional view similar to a portion of FIG. 10 but taken at a different plane for showing further details of the stop, and FIG. 13 is a plan view of the stop.

Figure 8:
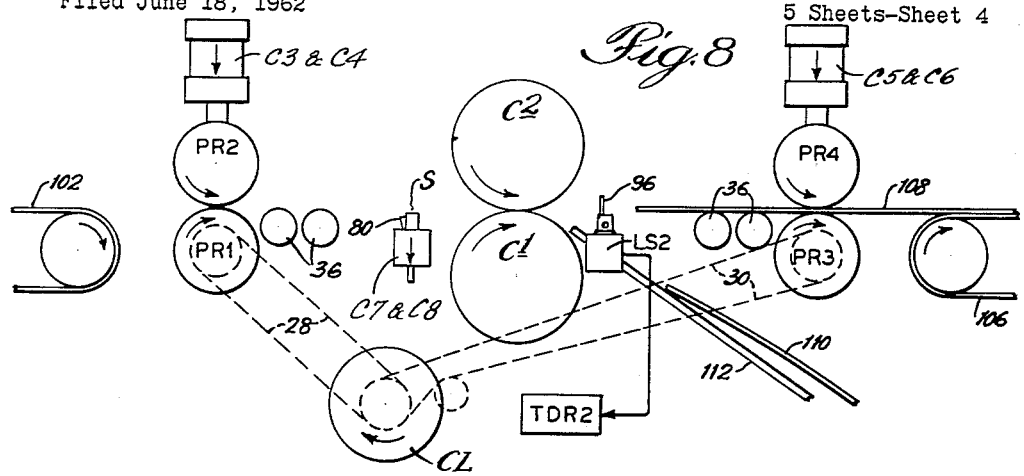

On the accompanying drawings we have used the reference numeral 14 to indicate a base housing on which the elements of our apparatus are mounted. Adjustable feet 16 serve to support the base 14 and level it with relation to a floor surface indicated at 15 in FIG. 1.

Bearing standards 18, 20, 22 and 24 are mounted adjacent four corners of the base housing 14 and in their upper ends are provided with bearings for supporting pinch rolls PR1 and PR2 on the standards 18 and 20 and PR3 and PR4 on the standards 22 and 24 in such manner that the rolls PR1 and PR3 are fixed in elevation relative thereto and the rolls PR2 and PR4 may be lowered in to contact with the rolls PR1 and PR2 or raised out of contact therewith by means of two pairs of double acting pneumatic cylinders C3 and C4 for the pinch roll PR2 and a second pair C5 and C6 for the pinch roll PR4.

The pinch rolls are adapted to be driven from a drive shaft 26 through a clutch CL the output of which comprises a shaft 27 operatively connected by means of chains 28 and 30 directly to the pinch rolls PR1 and PR3. A pair of intermeshing gears 32 is provided for driving the pinch roll PR2 from the pinch roll PR1 and a similar pair for driving the pinch roll PR4 from the pinch roll PR3, each pair including a universally jointed jack shaft 34 shown in FIG. 1 to permit the raising and lowering of the rolls PR2 and PR4 by means of the cylinders C3, C4, C5 and C6 yet maintain proper driving connection.

Horizontally between the entrance pinch rolls and the exit pinch rolls, four freely rotatable rollers 36 are provided extending substantially the full length of the pinch rolls, and eight of them indicated 38 of shorter length extending between the rollers 36 as shown in FIG. 2. The rollers 38 are rotatably supported by the flanges of a channel shaped member 39.

Longitudinally of the base housing 14 are a pair of ways 40 and 42 shown in FIG. 3. A pair of cutter carrying housings 44 and 46 are movable therealong and each carries a pair of rotary cutter knives C1 and C2 with which are associated holding rollers 52 and 54 to prevent undesirable bending of the sheet of metal passing through the machine when the cutter knives C1 and C2 shear the marginal side edges therefrom.

The cutter knives and holding rolls are driven by suitable transmission mechanism within the housings 44 and 46 from a splined drive shaft 56 extending through both of the housings 44 and 46 and through a transmission housing 58 shown in FIG. 1 wherein means is provided for driving the shaft 56 from the shaft 26. The splined portions of the shaft 56 are protected by a pair of bellows 60, the right hand one in FIG. 1 being broken away to show the shaft 56 therein which is driven by suitable mechanism in a transmission housing 64 from an electric motor or other suitable prime mover indicated at 66.

For adjusting the housings 44 and 46 longitudinally of the ways 40 and 42 hand wheels 68 and 70 are provided secured to threaded rods 72 and 74 coacting with depending brackets 75 and 77 from the housings as also shown in FIG. 1. Thus the distance apart of the cutting edges of the rotary cutter knives C1 and C2 may be adjusted as from the maximum shown by solid lines in FIG. 1 to a minimum shown by dot-and-dash lines, and the device is thereby adjusted for trimming the side edges of sheets to various widths.

Feferring to FIG. 2 an arrow 76 shows the direction that the sheet of metal passes through the apparatus. Before reaching the cutter knives C1 and C2 the sheet engages stops S which are shown in detail in FIGS. 10, 12 and 13. Each stop is an electrode insulated from the frame of the machine and connected electrically with a wire 78. As shown in FIG. 4 there are two of the wires, while FIG. 6 indicates these wires extending to a sensing device SD and an amplifier A. The sensing device responds to micro currents in the wires 78 whenever a sheet of metal bridges the two stops S.

The stops S, besides serving as solid stops for the sheet, serve as mounting blocks for floating contacts 49 which are insulated from the stops S by insulators 48 and a cover plate 51 of insulating material. The contact 49 is normally held spaced from a contact plate 47 by a pair of springs 50. Contact 49 is the actual electrical contact and projects in front of the stop block S as shown at X in FIG. 13 (approximately .005″). This .005″ of travel assures positioning of the leading edge of the sheet 108 to within .005″ at one stop S after having engaged the other stop S. Usually the sheet will hit one stop first, after contacting its contact 49 and depressing it the distance X. Then as soon as the sheet hits the second contact 49 the circuit for the sensing device SD is completed and results in the entrance pinch rolls closing by the time the second contact 49 has been depressed and the sheet has contacted the second stop S, thus assuring a squared product within minutely accurate limits.

Before the sheet engages the stops, however, it engages bumpers 80 which are pivotally mounted at 81 on slides 82 for vertical adjustment in response to double acting pneumatic cylinders C7 and C8 as will hereinaftr appear. The slides 82 carry buffer cylinders 85 in which have pistons 84 on piston rods 86 that project from both ends of each cylinder. The bumpers 80 engage the upper ends of these rods while the lower ends are adapted to be stopped by adjustable stops 88. The cylinders 85 contain hydraulic fluid and have a closed hydraulic circuit so that the pistons 84 therein act as dash pots under control of flow-control needle valves 90 having adjusting knobs 92 to adjust the orifices and thereby the snubbing action on the bumpers 80. Adjustment of the valves 90 may be made for different weight sheets being handled. One valve 90 may be provided for both of the cylinders if desired.

With further reference to FIG. 10, a table 94 is shown having slots 62 through which the stops S and bumpers 80 extend on the ingoing side of the cutter knives C1 and C2. This table is suitably notched as shown to accommodate the cutter knives, and on the outgoing side the table is slotted at 79 to receive an actuating finger 96 of a limit switch LS2 which has an actuating arm constrained to the vertical position shown.

Referring to FIG. 12, a limit switch LS1 is shown adapted to be actuated by a stud 98 carried by the slide 82 which engages a roller 100 of the limit switch to actuate the switch when the slide moves downwardly a predetermined amount during the cycling of the apparatus.

*Practical Operation*

Referring to FIG. 5, ahead of our apparatus is a delivery conveyor 102 and following our apparatus is a take-away conveyor 106. The parts are in the position they assume at the beginning of a cycle of automatic operation with the following condition prevailing—clutch disengaged, entrance pinch rolls opened and stopped, sheet stops up, cutter knives running and exit pinch rolls closed and stopped. This allows the cut sheet to enter between the entrance pinch rolls and come to rest against the stops S. Shear blades 104 are illustrated which in a previous machine cut the web of sheet metal being uncoiled from the roll into suitable lengths and delivers them as sheets to our apparatus. Such a sheet 108 is illustrated being propelled by thec onveyor 102 (on which it rests by gravity) past the open pinch rolls PR1 and PR2 and toward the stops S. The leading edge of the sheet will first engage the bumpers 80 which act as buffers to absorb the shock and slow down the forward progress of the moving sheet and permit it to be propelled further by means of frictional engagement with the conveyor 102 until its edge engages both of the stops S and such edge is snug against both stops. Thereupon a microcircuit is established through the sheet between the two stops and through the wires 78 to actuate the sensing device SD as indicated in FIG. 6.

The amplifier A of the sensing device amplifies the microcurrent and sends current to a relay R1 and a time delay relay TDR1. The relay R1 actuates a solenoid valve SV1 to open communication from an air supply A to the top of the cylinders C3 and C4 thereby closing the pinch rolls PR1 and PR2 to firmly hold the sheet 108 properly oriented against the stops S.

Soon after contact is made the time delay relay TDR1 times out and actuates a solenoid valve SV2 as shown in FIG. 7 sending air to the tops of cylinders C7 and C8 to lower the stops S below the pass line of the sheet 108 so that it can progress past them. As soon as both stops S are lowered, their limit switches LS1 are closed to actuate the clutch CL (which heretofore has been declutched as shown by dotted lines in FIGS. 5 and 6) to drive the chains 28 and 30 and thereby the pinch rolls PR1, PR2, PR3 and PR4. The pinch rolls PR1 and PR2 keep the sheet 108 oriented as they force it past the cutter knives C1 and C2 and the scraps indicated at 110 in FIG. 7 pass down a pair of chutes 112 shown in FIG. 10.

Also as in FIG. 7 the sheet 108 actuates the limit switch LS2 to its non-normal position, but this limit switch is the type that does not actuate a control circuit until it returns to its initial position as shown in FIG. 8 after the sheet 108 has passed, whereupon it actuates a time delay relay TDR2 as shown.

Figure 9:
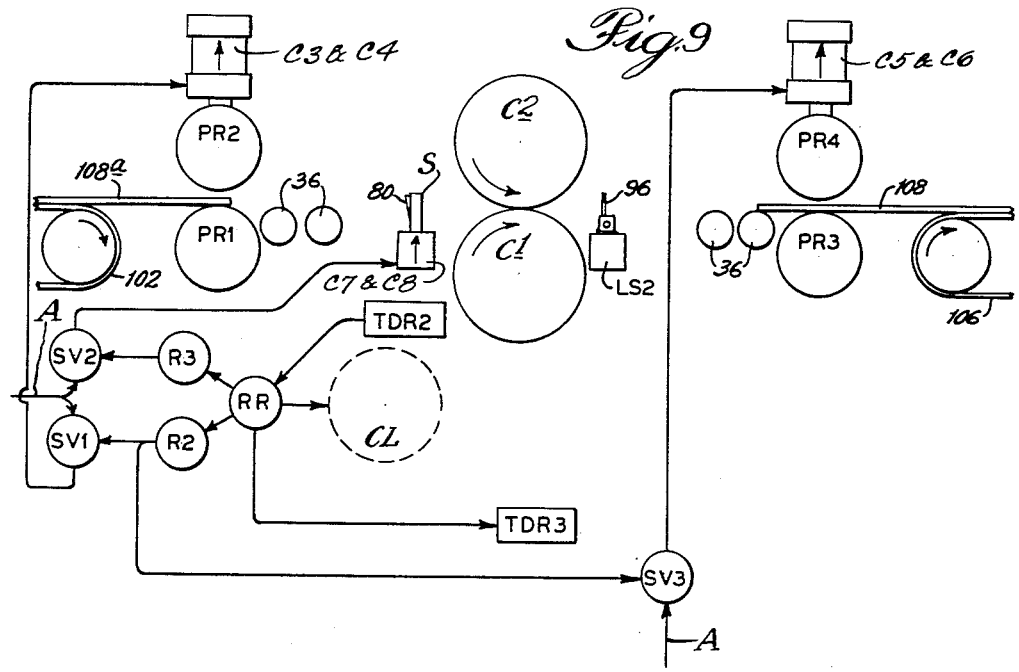

Referring to FIG. 9 when the time delay relay TDR2 times out it actuates a reset relay RR which through a relay R2 actuates the solenoid valve SV1 and through a relay R3 actuates the solenoid valve SV2 for supplying air to the lower ends of the cylinders C3, C4, C7 and C8 thus opening the entrance pinch rolls PR1 and PR2 to permit a second sheet 108a to enter our trimming apparatus, and raising the stops S to the initial position shown in FIG. 5. The relay R2 also actuates a solenoid valve SV3 which sends air to the lower ends of the cylinders C5 and C6 for also opening the exit pinch rolls PR3 and PR4 whereupon the take-away conveyor 106 removes the sheet 108 from our trimming apparatus, or if desired the sheets may be delivered to a stacker.

Still another function of the reset relay RR is to energize a time delay relay TDR3. Returning to FIG. 5 when the time delay relay TDR3 times out it actuates a relay R4 for again actuating the solenoid valve SV3 for sending air to the upper ends of the cylinders C5 and C6 thus closing the exit pinch rolls PR3 and PR4 preparatory to receiving the sheet 108a after its side edges have been trimmed.

From the foregoing specification it will be obvious that we have provided apparatus for trimming the two side edges of a sheet parallel with each other and at right angles (or any other desired angle) relative to a leading edge of the sheet thus providing uniformly accurate sheets with respect to three of their edges whereupon the fourth edge may be trimmed at the desired angle relative to the parallel side edges thus producing truly rectangular sheets if desired or uniform sheets of other-than-rectangular outline.

Some changes may be made in the construction and arrangement of the parts of our apparatus for trimming edges of sheets without departing from the real spirit and purpose of our invention. It is accordingly our intention to cover by our claims any modified forms of structure or use of mechanical equivalents which may be reasonably included within their scope.

We claim:

1. An apparatus for trimming the edges of sheets comprising a frame, a pair of entrance pinch rolls and a pair of exit pinch rolls on opposite sides of said frame, means for driving said pinch rolls, means for opening and closing said entrance pinch rolls, retractable sheet stops downstream of said entrance pinch rolls and spaced apart longitudinally thereof, means operable by engagement of the leading edge of a sheet with both of said stops to close said entrance pinch rolls and retract said stops, edge trimmers for the sheet as it is advanced by said entrance pinch rolls said edge trimmers being located downstream of said stops, means for opening and closing said exit pinch rolls, and means downstream of said edge trimmers and operable by passage of the sheet from said edge trimmers to open said exit pinch rolls, said stops, said side edge trimmers and said last means all being upstream from said exit pinch rolls.

2. In apparatus for trimming the side edges of sheets, a frame, a pair of entrance pinch rolls and a pair of exit pinch rolls at opposite ends of said frame, means for driving said pinch rolls, means for opening and closing said entrance pinch rolls, retractable sheet stops spaced apart laterally of a sheet passing longitudinally through said apparatus, means operable by engagement of the leading edge of a sheet with both of said stops to effect closure of said entrance pinch rolls and retract said stops, side edge trimmers for the sheet as it is advanced by said entrance pinch rolls, said side edge trimmers being arranged at a predetermined angle relative to a sheet edge when engaged with both of said stops, means for opening and closing said exit pinch rolls, and means operable by passage of the sheet from said edge trimmers to effect opening of said exit pinch rolls, said stops, said side edge trimmers and said last means being arranged in that order downstream of said entrance pinch rolls and upstream from said exit pinch rolls.

3. In apparatus for trimming the side edges of rectangular sheets, a frame, entrance pinch rolls and exit pinch rolls on opposite sides of said frame, means for driving said pinch rolls, a pair of sheet stops between and spaced longitudinally of said rolls, means operable by engagement of the leading edge of a sheet with both of said stops to close said entrance pinch rolls and thereby advance the sheet, means to retract said stops so the sheet can be so advanced, side edge trimmers for the sheet as it is advanced by said entrance pinch rolls, and means operable by passage of the sheet from said edge trimmers to open said exit pinch rolls, said stops, said side edge trimmers and said last means being arranged in that order downstream of said entrance pinch rolls and upstream from said exit pinch rolls.

4. Apparatus for trimming the edges of sheets comprising a frame, a pair of entrance pinch rolls and a pair of exit pinch rolls on opposite sides of said frame, means for driving said pinch rolls, means for opening and closing said entrance pinch rolls, retractable sheet stops between and spaced apart longitudinally of said rolls, means operable by engagement of the leading edge of a sheet with both of said stops to close said entrance pinch rolls and thereby advance the sheet, means to thereupon retract said stops so that the sheet can be so advanced, side edge trimmers for the sheet as it is advanced by said entrance pinch rolls, means for opening and closing said exit pinch rolls, and means operable by the sheet leaving said edge trimmers to open said entrance and said exit pinch rolls and thereafter close said exit pinch rolls, said stops, said side edge trimmers and said last means being arranged in that order downstream of said entrance pinch rolls and upstream from said exit pinch rolls.

5. Apparatus of the character disclosed comprising a frame, a pair of entrance pinch rolls and a pair of exit pinch rolls journalled on said frame means for driving said pinch rolls, means for opening and closing said entrance pinch rolls, a pair of laterally spaced apart retractable sheet stops, means operable by engagement of the leading edge of a sheet with both of said stops to close said entrance pinch rolls for advancing the sheet and to retract said stops to permit of such advance, side edge trimmers for the sheet as it is advanced by said entrance pinch rolls, means for opening and closing said exit pinch rolls, and means operable by passage of the sheet from said edge trimmers to open said entrance and said exit pinch rolls and thereafter close said exit pinch rolls, said stops, said side edge trimmers and said last means being arranged in that order downstream of said entrance pinch rolls and upstream from said exit pinch rolls.

6. In apparatus of the character disclosed, a frame, entrance and exit pinch rolls on opposite sides thereof, means for opening and closing said pinch rolls, retractable sheet stops spaced laterally of a sheet passing longitudinally through said rolls, said stops having floating parts, a circuit established by the leading edge of a sheet engaging said floating parts of said stops, means in response to said circuit for closing said entrance pinch rolls and thereafter retracting said stops, means for driving said pinch rolls, a control clutch therefor, said clutch being rendered operative by retraction of said stops, side edge trimmers for the sheet as it is advanced by said entrance pinch rolls, and means operable by the passage of the sheet from said side edge trimmers to open said pinch rolls and extend said stops and to thereafter reclose said exit pinch rolls, said stops, said side edge trimmers and said last means being arranged in that order downstream of said entrance pinch rolls and upstream from said exit pinch rolls.

7. In apparatus of the character disclosed, a frame, entrance and exit pinch rolls on opposite sides thereof, means for opening and closing said pinch rolls, retractable sheet stops spaced laterally of a sheet passing longitudinally through said rolls, said stops having solid parts and floating parts, the latter projecting beyond the former to be engaged by such edge in advance of the latter being engaged thereby, a circuit established by the leading edge of a sheet engaging said floating parts of said stops, means in response to said circuit for closing said entrance pinch rolls and thereafter retracting said stops, means for driving said pinch rolls, a control clutch therefor, said clutch being rendered operative by retraction of said stops, side edge trimmers for the sheet as it is advanced by said entrance pinch rolls, means operable by the passage of the sheet from said side edge trimmers to open said pinch rolls and extend said stops and to thereafter reclose said exit pinch rolls, said stops, said side edge trimmers and said last means being arranged in that order downstream of said entrance pinch rolls and upstream from said exit pinch rolls.

8. In apparatus of the character disclosed, a frame, entrance and exit pinch rolls on opposite sides thereof, means for opening and closing said pinch rolls, retractable sheet stops spaced laterally of a sheet passing longitudinally through said rolls, said stops having solid parts and floating parts, the latter projecting beyond the former a few thousandths of an inch to be engaged by such edge in advance of the latter being engaged thereby, a circuit established by the leading edge of a sheet engaging said floating parts of said stops, means in response to said circuit for closing said entrance pinch rolls and thereafter retracting said stops, means for driving said pinch rolls, a control clutch therefor, said clutch being rendered operative by retraction of said stops, side edge trimmers for the sheet as it is advanced by said entrance pinch rolls, and means operable by the passage of the sheet from said side edge trimmers to open said pinch rolls and extend said stops and to thereafter reclose said exit pinch rolls, said stops, said side edge trimmers and said last means being arranged in that order downstream of said entrance pinch rolls and upstream from said exit pinch rolls.

9. In apparatus of the character disclosed, a frame, a pair of entrance pinch rolls and a pair of exit pinch rolls mounted thereon, means for opening and closing said pinch rolls, retractable sheet stops spaced laterally of a sheet passing longitudinally through said rolls, a circuit established by the leading edge of a sheet engaging said stops, hydraulically controlled buffers engageable by such leading edge in advance of engagement therefor with said stops, means responsive to said circuit for closing said entrance pinch rolls, delayed action means for thereafter retracting said stops, means for driving said pinch rolls, said means being rendered operative by retraction of said stops, side edge trimmers for the sheet as it is advanced by said entrance pinch rolls, means operable by the passage of the sheet from said side edge trimmers to open said pinch rolls and extend said stops, and delayed action means for thereafter reclosing said exit pinch rolls, said stops, said side edge trimmers and said last means being arranged in that order downstream of said entrance pinch rolls and upstream from said exit pinch rolls.

10. In apparatus of the character described, a frame, a pair of entrance pinch rolls and a pair of exit pinch rolls on opposite sides thereof, means for opening and closing said entrance pinch rolls and said exit pinch rolls, retractable sheet stops spaced laterally of a sheet passing longitudinally through said rolls, a circuit established by the leading edge of a sheet engaging said stops, means responsive to said circuit for closing said entrance pinch rolls and actuating a time delay relay, said time delay relay effecting retraction of said stops, means for driving said pinch rolls, a control clutch therefor, said clutch being rendered operative by retraction of said stops, side edge trimmers for the sheet as it is advanced by said entrance pinch rolls, means operable by the passage of the sheet from said side edge trimmers to open said pinch rolls, extend said stops and actuate a second time delay relay, said second time delay relay effecting reclosure of said exit pinch rolls, said stops, said side edge trimmers and said last means being arranged in that order downstream of said entrance pinch rolls and upstream from said exit pinch rolls.

11. Apparatus for trimming the edges of sheets comprising a frame, entrance and exit pinch rolls mounted on said frame, means for driving said pinch rolls, means for opening and closing said entrance pinch rolls, a pair of spaced retractable sheet stops downstream of said entrance pinch rolls, means operable by engagement of the leading edge of a sheet with both of said stops to close said entrance pinch rolls and to retract said stops upon closure thereof, side edge trimmers downstream of said stops for the sheet as it is advanced by said entrance pinch rolls, means for opening and closing said exit pinch rolls, and means downstream of said side edge trimmers operable by passage of the sheet from said edge trimmers to open said entrance and said exit pinch rolls and to close said exit pinch rolls after the sheet has passed therethrough, said stops, said side edge trimmers and said last means all being upstream from said exit pinch rolls.

References Cited in the file of this patent
UNITED STATES PATENTS

| | | |
|---|---|---|
| 1,601,127 | McFarland | Sept. 28, 1926 |
| 1,614,446 | Lukens | Jan. 11, 1927 |
| 1,670,051 | Slaysman | May 15, 1928 |
| 1,678,458 | Biggert | July 24, 1928 |
| 2,209,220 | Berry | July 23, 1940 |
| 2,607,421 | Anderson | Aug. 19, 1952 |
| 2,701,013 | Klasing | Feb. 1, 1955 |
| 2,757,441 | Muse | Aug. 7, 1956 |
| 2,779,413 | Gage | Jan. 29, 1957 |